United States Patent
Wang et al.

(10) Patent No.: US 11,938,441 B2
(45) Date of Patent: Mar. 26, 2024

(54) FOG-BASED ELECTRICAL POWER GENERATOR AND SELF-POWERED SYSTEM

(71) Applicant: City University of Hong Kong, Hong Kong (HK)

(72) Inventors: Zuankai Wang, Hong Kong (HK); Steven Wang, Hong Kong (HK); Chen Ling, Hong Kong (HK); Xiaoxue Yao, Hong Kong (HK); Yat Hei Wong, Hong Kong (HK)

(73) Assignee: City University of Hong Kong, Hong Kong (HK)

( * ) Notice: Subject to any disclaimer, the term of this patent is extended or adjusted under 35 U.S.C. 154(b) by 361 days.

(21) Appl. No.: 17/533,155

(22) Filed: Nov. 23, 2021

(65) Prior Publication Data

US 2022/0176268 A1  Jun. 9, 2022

Related U.S. Application Data

(60) Provisional application No. 63/122,567, filed on Dec. 8, 2020.

(51) Int. Cl.
| | |
|---|---|
| *B01D 5/00* | (2006.01) |
| *E03B 3/28* | (2006.01) |
| *H02N 1/06* | (2006.01) |
| *H02N 11/00* | (2006.01) |

(52) U.S. Cl.
CPC ........... *B01D 5/009* (2013.01); *B01D 5/0015* (2013.01); *B01D 5/0051* (2013.01); *B01D 5/0057* (2013.01); *E03B 3/28* (2013.01); *H02N 1/06* (2013.01); *H02N 11/002* (2013.01)

(58) Field of Classification Search
CPC .... B01D 5/009; B01D 5/0015; B01D 5/0051; B01D 5/0057; E03B 3/28; H02N 1/06; H02N 11/002; H02N 1/08
See application file for complete search history.

(56) References Cited

U.S. PATENT DOCUMENTS

| | | | | |
|---|---|---|---|---|
| 4,206,396 A | * | 6/1980 | Marks | ...... H02N 3/00 310/309 |
| 2011/0240539 A1 | * | 10/2011 | Nose | ...... B01F 33/05 210/192 |
| 2016/0040401 A1 | * | 2/2016 | Berman | ...... F03D 9/00 62/93 |
| 2021/0389063 A1 | * | 12/2021 | Al Alili | ...... B03C 3/014 |
| 2023/0398256 A1 | * | 12/2023 | Ranjan | ...... A61L 2/035 |

* cited by examiner

*Primary Examiner* — Kun Kai Ma
(74) *Attorney, Agent, or Firm* — Idea Intellectual Limited; Margaret A. Burke; Sam T. Yip

(57) ABSTRACT

A fog-based self-powered system for collecting atmospheric water and generating electricity is presented. The system includes a mesh-based fog harvester for accumulating water droplets from atmospheric moisture. A droplet distributor receives accumulated water droplets from the mesh-based fog harvester. A droplet electrical generator harvests energy from the water droplets accumulated in the droplet distributor. The droplet electrical generator includes an electret surface for receiving the water droplets from the droplet distributor and at least two electrodes. A water reservoir receives water droplets from the droplet electrical generator.

12 Claims, 9 Drawing Sheets

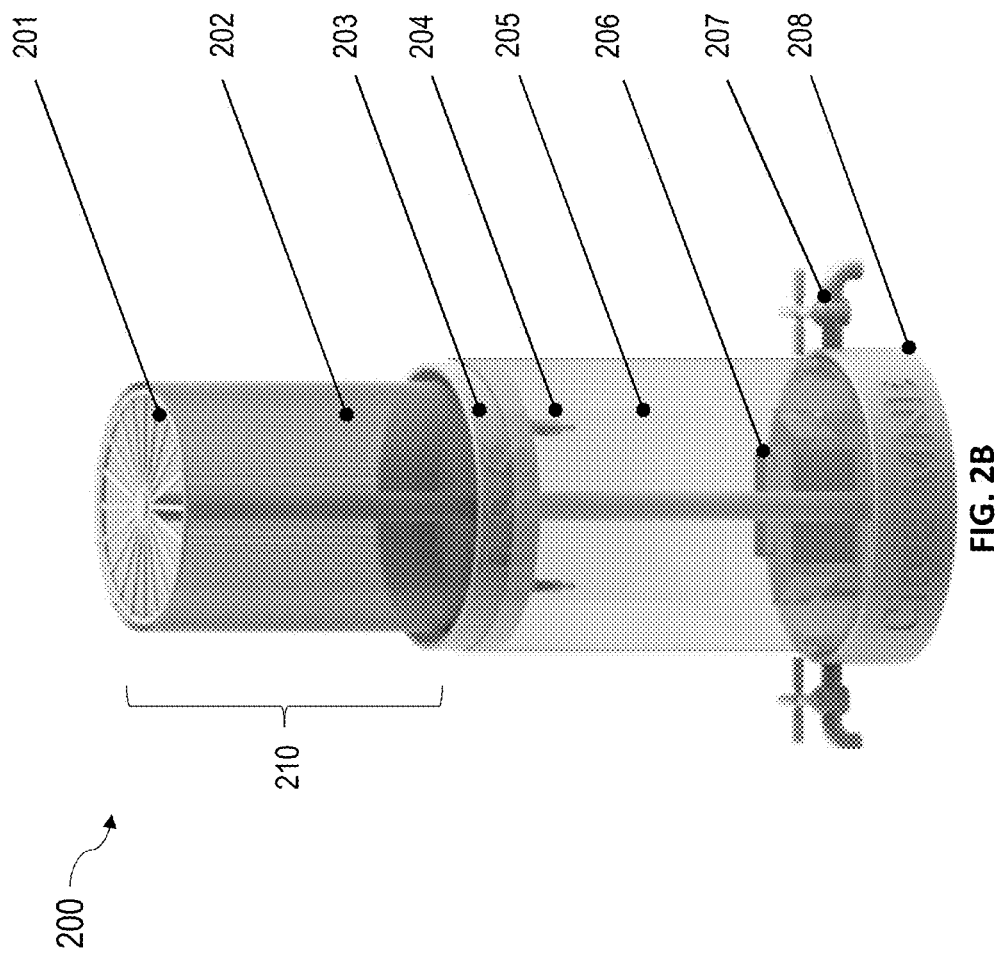

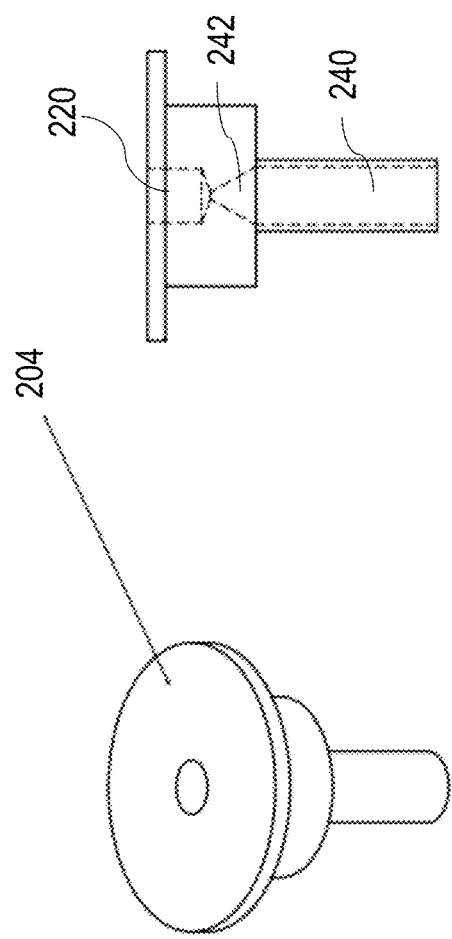

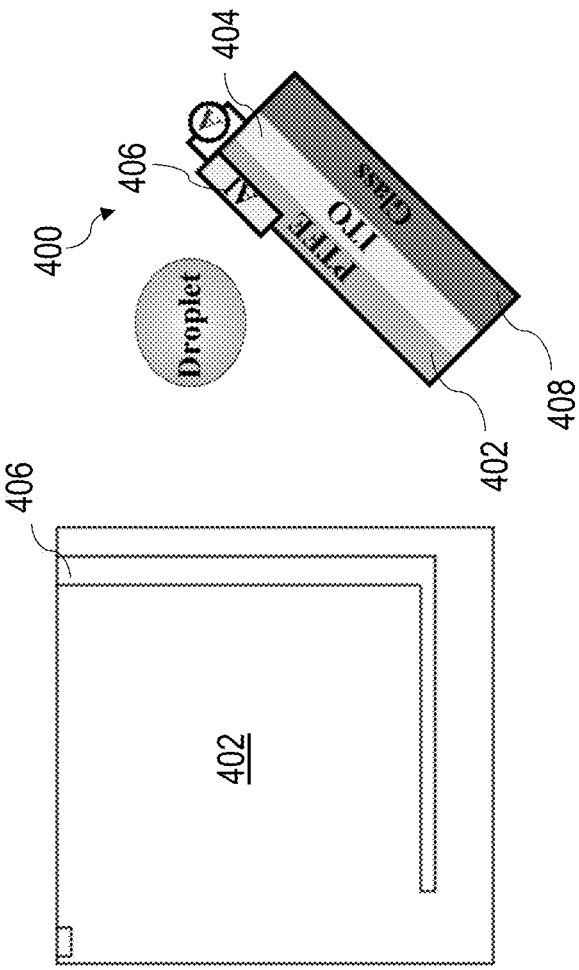
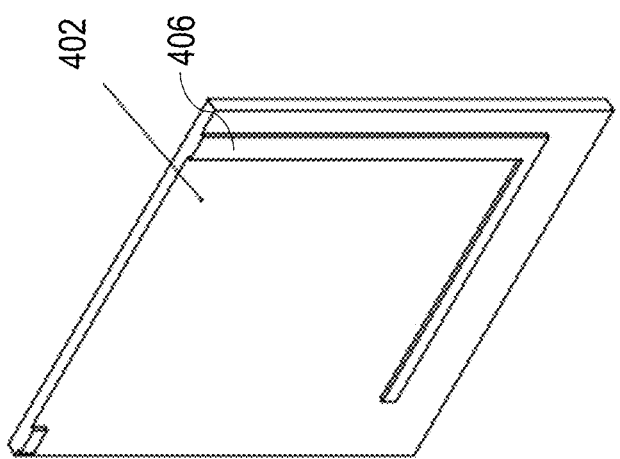
FIG. 5A  FIG. 5B  FIG. 5C

FOG-BASED ELECTRICAL POWER GENERATOR AND SELF-POWERED SYSTEM

CROSS-REFERENCE TO RELATED APPLICATIONS

The present application claims priority to U.S. Provisional Patent Application 63/122,567, filed 8 Dec. 2020, the disclosure of which is incorporated by reference herein.

FIELD OF THE INVENTION

The present invention relates to energy harvesting systems and, more particularly, to energy harvesting systems based on atmospheric moisture.

BACKGROUND

Atmospheric moisture, including fog, vapor, aerosol, and clouds, have roughly accounted for 10% of the world's freshwater. Especially in coastal regions like Hong Kong, the annual mean relative humidity is as high as 80%. In striking contrast to universal large-scale energy harvestings, such as solar, wind, thermal, and hydropower, ambient moisture as an abundant source has seldom been applied to energy generation. Almost all the existing fog harvesting systems are designed for freshwater collection only.

Thus, there is a need in the art for energy-harvesting systems based on atmospheric moisture. Such energy-harvesting systems could be used to provide both electrical power and a source of fresh water.

SUMMARY OF THE INVENTION

The present invention provides a system harvest both energy and fresh water from high-humidity air via the fog-based self-powered system (FSS), which combines a newly-developed high-power density droplet-based generator (DEG) with bioinspired fog harvesting mesh material. Different configurations of the integrated system are provided to meet optimal aerodynamic properties and compactness requirements such that the system may be used in different environments. The present invention shows the highest fog-based energy-conversion efficiency reported to date with important application to energy/water harvesting. The fog-based self-powered system can supply power for portable devices/road illumination in remote mountain/coastal regions with high or above-average humidity, and at the same time provide fresh water for agricultural irrigation and domestic use.

The FSS provides engineering solutions to two main needs of the future world: 1. self-powered smart sensors to cope with rising data survey demand in a smart city. 2. addressing worldwide fresh water shortage crisis.

In accordance with a first aspect of the present invention, there is provided a fog-based self-powered system for generating electric power from ambient fog, comprising: a fog harvester, a droplet distributor, a droplet electrical generator, and a water reservoir. In one aspect, the morphology of the fog harvester is a plate mesh structure including fibers having a characteristic radius, a characteristic spacing, and a characteristic spacing ratio. The mesh material may be a UV curable resin, which may optionally be fabricated by three-dimensional printing. In one aspect, the surface layer may be superhydrophobic, for example, through surfaces including PDMS-fumed silica micro-nano structures.

A water reservoir and flow rate controller are included in the system. The reservoir structure may include an upside-down "V" form resin channel or a deep plate form resin container. It may include a drip chamber, a flow control clamp, and a capillary. A hydrophobic thermoplastic elastomer (TPE) may be used. For the droplet electrical generator, a PTFE film on an ITO glass electrode may be used with an Al tape electrode. Preferably, the surface is hydrophobic. The composition is two 45° inclined planes and a water tank. Preferably, the material is hydrophobic UV curable resin. Preferably, the power generator comprises a droplet electrical generator adhering to the surface. A power indicator in the form of LEDs may be provided.

BRIEF DESCRIPTION OF THE DRAWINGS

FIG. 2B is a cylinder-shaped fog-based self-powered system according to an embodiment.

FIGS. 4A-4B show an example of a droplet regulator used in the fog-based self-powered system of FIG. 2B.

FIGS. 5A-5C depict different views of a droplet-based electrical generator employed in the fog-based self-powered system of FIG. 2B.

DETAILED DESCRIPTION

Figure 1:
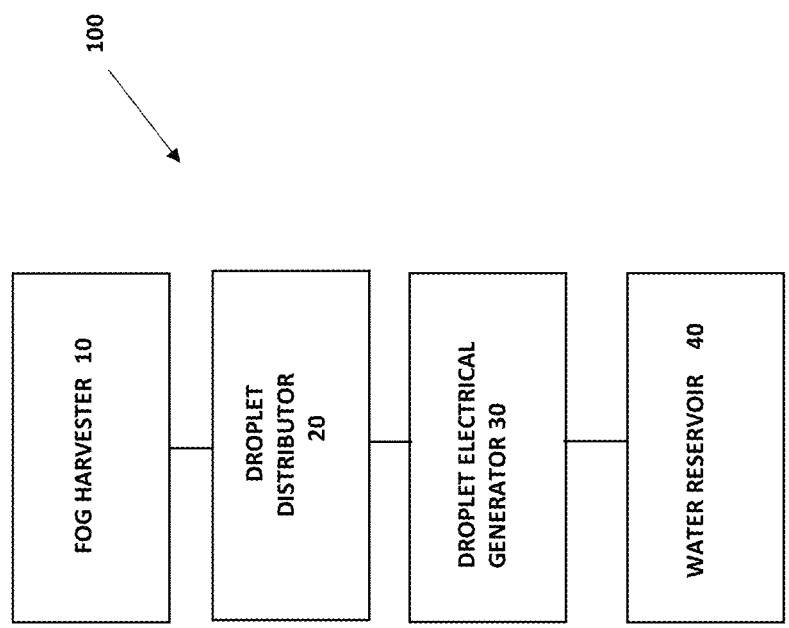
FIG. 1 is a schematic overview of the fog-based self-powered system (FSS) according to an embodiment.

Turning to the drawings in detail, a fog-based self-powered system (FSS) 100 is provided. The fog-based self-powered system 100 includes a fog harvester 10, a droplet distributor 20, a droplet-based electrical generator 30, and a water reservoir 40. By integrating these components, the portable FSS may operate an eco-friendly power source that can charge small electronic products and sustainably supply fresh water in remote areas.

Figure 2A:
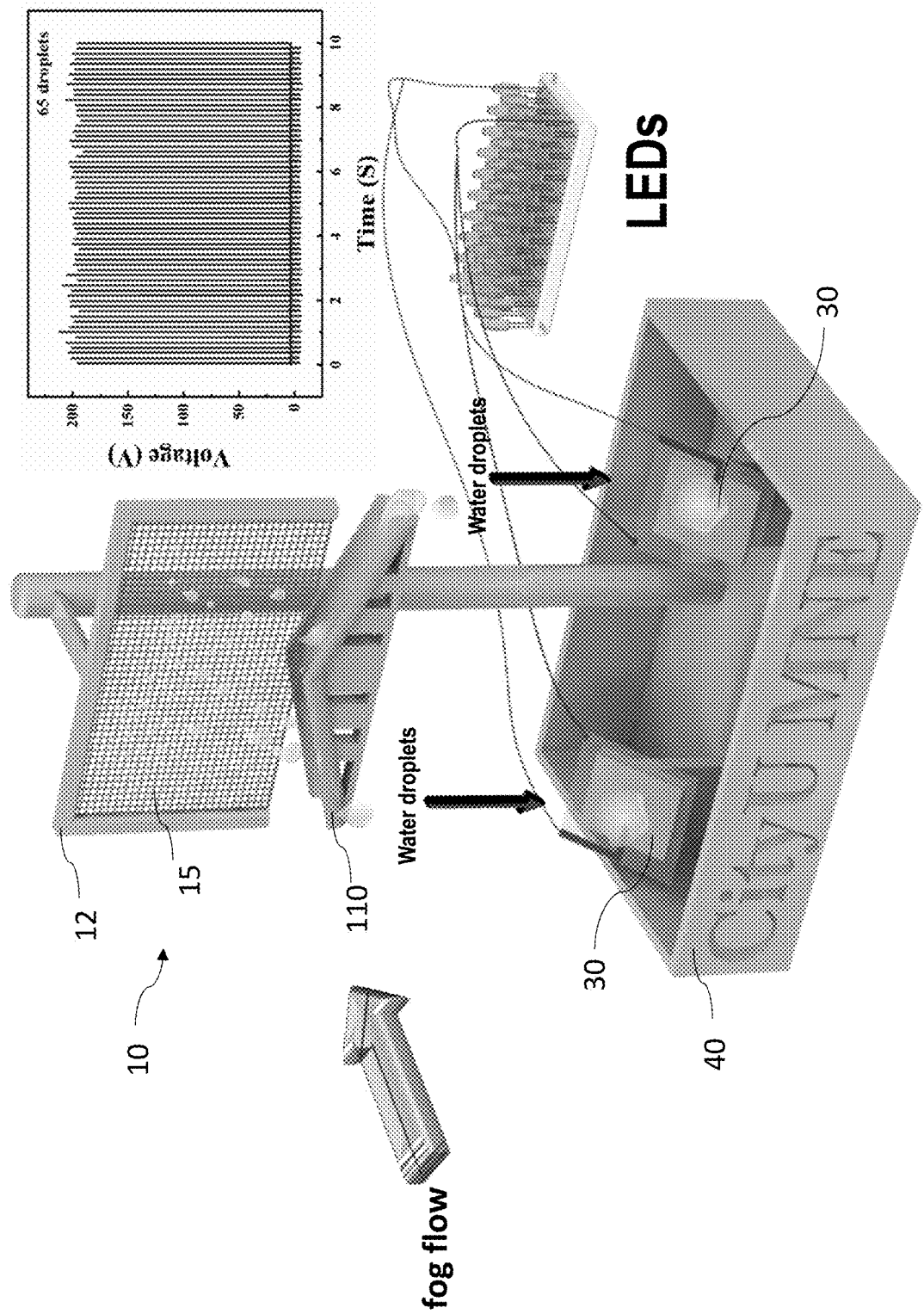
FIG. 2A is a planar-shaped fog-based self-powered system according to an embodiment.

In one aspect, the fog harvester 10 may be a mesh-based fog harvester, depicted in fog-based self-powered system of FIG. 2A The fog harvester 10 includes a porous mesh structure 15 interwoven supported by a mesh frame 12. In one embodiment, the porous mesh structure may include an array of uniform fibers having approximately the same spacing ratio. The void spaces of the mesh may overcome wind resistance as compared to a solid substrate, and thus facilitate the deposition of tiny droplets on mesh fibers; this model is inspired by spider webs that collect dew from condensed fog in the morning. The fog harvester portion of the system may alternatively take the form of a tower, a series of blades, or a cylinder. To improve the manufacturability of complex three-dimensional shapes and to reduce cost, the fog harvester may be fabricated by a mature three-dimensional (3D) printing technology.

To separate the water into uniform droplets and establish a linear relationship between a fog harvesting amount and electricity output, the collected water will fall into a droplet distributor. For the mesh fog harvester of FIG. 2A, the droplet distributor takes the form of an upside-down V-form channel 110. The water droplets exiting distributor 110 impinge on the droplet energy generator 30, to be discussed in further detail below. After the droplet energy generator 30, the water accumulates in water reservoir 40.

FIG. 2B depicts an alternative embodiment of a fog-based self-powered system 200 of the present invention. FIG. 2B shows a substantially cylindrical mesh fog harvester 210 for harvesting water in substantially three directions. In the system of FIG. 2B, water from the mesh fog harvester accumulates, temporarily, in freshwater collection tank 203. From the collection tank 203, the water distribution is controlled by water droplet regulator 204. An enlarged view of droplet regulator 204 is depicted in FIG. 4 and includes an upper chamber 220 that receives a supply of water to be distributed. This chamber communicates with lower chamber 240 that includes a constricted upper portion 242 that only allows passage of individual droplets due to the constriction coupled with the surface tension of the water.

The droplet regulator 204 is positioned at a height on the order of 15-25 cm above the droplet-based energy generator 206, to be discussed in further detail below. The droplet-based energy generators may be positioned on included supports (approximately 45 degrees); the inclined angle inhibits the adhesion of residual water on the surface of the generator, improving the efficiency of energy generation. The droplet-based energy generator uses the energy created when the droplets impinge on the generator surface to create electricity that may be used or sent to an energy storage device such as a battery. After impinging upon the droplet energy generator, the water is accumulated in freshwater collection tank 208. A water outlet/faucet 207 may be connected to the water reservoir 208 to transfer the water into pipes or other transfer devices. Further, a sponge may be placed in the tank to adsorb water, inhibiting the evaporation of harvested water in arid areas.

Figure 3:
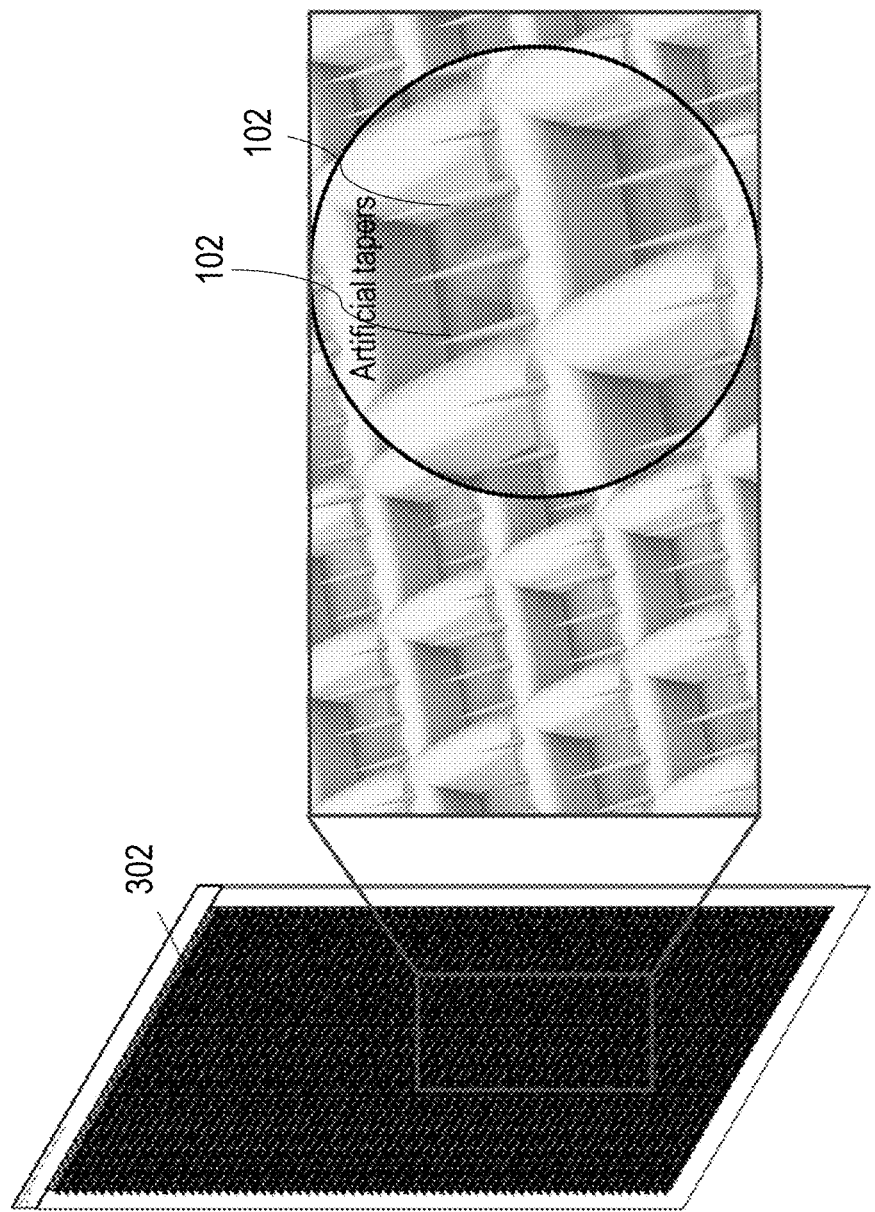
FIG. 3 depicts a close-up of a mesh structure used in a fog-based self-powered system.

A mesh with an optimal geometry is designed as depicted in FIG. 3. The thickness of the mesh may be selected to be in the range of approximately 250 microns to 500 microns; the depicted mesh is approximately 344 μm, the length and width of the mesh are approximately 8 cm and 5 cm, respectively; the length and width may be arbitrarily selected based on a desired three-dimensional shape using the mesh. A characteristic radius (R) of the mesh pores may be on the order of 150-250 microns; the depicted mesh is approximately 172 μm, with an inter-pore characteristic spacing (2D) of approximately 860 μm. After slicing 3D models by slicing software, a high-precision but low-cost commercial 3D printer is used to fabricate the selected microstructures layer by layer, permitting efficient manufacture of complex configurations with inexpensive but durable UV curable resin. Exemplary UV-curable resins include HEK resin, ABS, and PLA resin.

In the mesh 302 of FIG. 3, a series of artificial tapers 102 may be formed. These artificial tapers 102 assist in increasing the flow of accumulated droplets. Deposited water accumulates on the artificial tapers 102; upon reaching a critical mass where gravity overcomes the attractive forces holding the water droplets on the fibers, the water droplets slide down the mesh to a water accumulation structure. However, this slow accumulation process can be disrupted by the competing phenomenon of evaporation, harming the efficiency of fog collection. To raise the water draining velocity, a superhydrophobic coating may be fabricated on the surface by coating the mesh with a blend of nano-silica and a polymer. Exemplary polymers include polysiloxanes such as polydimethylsiloxane (PDMS). The fumed silicas are suitable to form hierarchical roughness and PDMS will be chosen as the low surface energy material to reduce the mesh surface energy. The two factors will reduce the affinity between the water droplets and the mesh surface, accelerating the droplet accumulating by gravitational force, and freeing the mesh surface to harvest new droplets from the atmosphere.

FIG. 5 schematically depicts a droplet-based energy generator 400 according to an embodiment. The droplet electrical generator 400 operates by the principle of triboelectrification. In general, triboelectrification occurs when two materials make contact, resulting in electrical effects, such as the generation of static in dry winter periods. The emergence of triboelectric nanogenerators enables the conversion of weak mechanical energy into electricity by triboelectrification. Inspired by field effect transistors, the droplet electrical generator 400 comprises a polytetrafluoroethylene (PTFE) film 402 on a clean indium tin oxide (ITO) electrode 404 deposited on a substrate 408. A small aluminum (Al) tape electrode 406 is positioned on the surface of the PTFE layer 402 and electrically communicates with the ITO electrode 404. PTFE is chosen as the electret material in this embodiment because it is one of the best electronegative materials for negative charge storage. Importantly, the PTFE, ITO, and Al are all low-cost and commercially available.

The fabrication process of the droplet electrical generator starts with the deposition of commercial PTFE precursor (AF 601S2, 6 wt % DuPont) on a clean indium tin oxide (ITO) glass electrode (3×3 cm2) by drop-casting. Next, the component is cured by heating to form a PTFE film. The thickness of the PTFE can be tailored by controlling the volume of the precursor and may range from 10-30 microns. In the example of FIG. 5, the thickness of the PTFE film is 15 μm. Finally, a small L-form aluminum (Al) tape (1.5×0.5 cm$^2$) with a thickness of about 100 nm is assembled on the top right corner of the PTFE substrate.

According to contact triboelectrification, the PTFE film becomes negatively charged when connecting with a droplet. To maintain electrical neutrality, positive charges will be generated on the droplet surface. Once the spreading droplet touches the Al electrode, the positive charges will rapidly transfer from ITO to Al to form a closed-loop circuit. As the droplet detaches from the surface until it completely detaches, the generated current will turn negative until it goes to zero. Charges are stored in the PTFE film by successive interaction between falling droplets and the PTFE film until reaching a plateau. Consequently, the instantaneous peak power density and energy conversion efficiency will boost dramatically.

Figure 6:
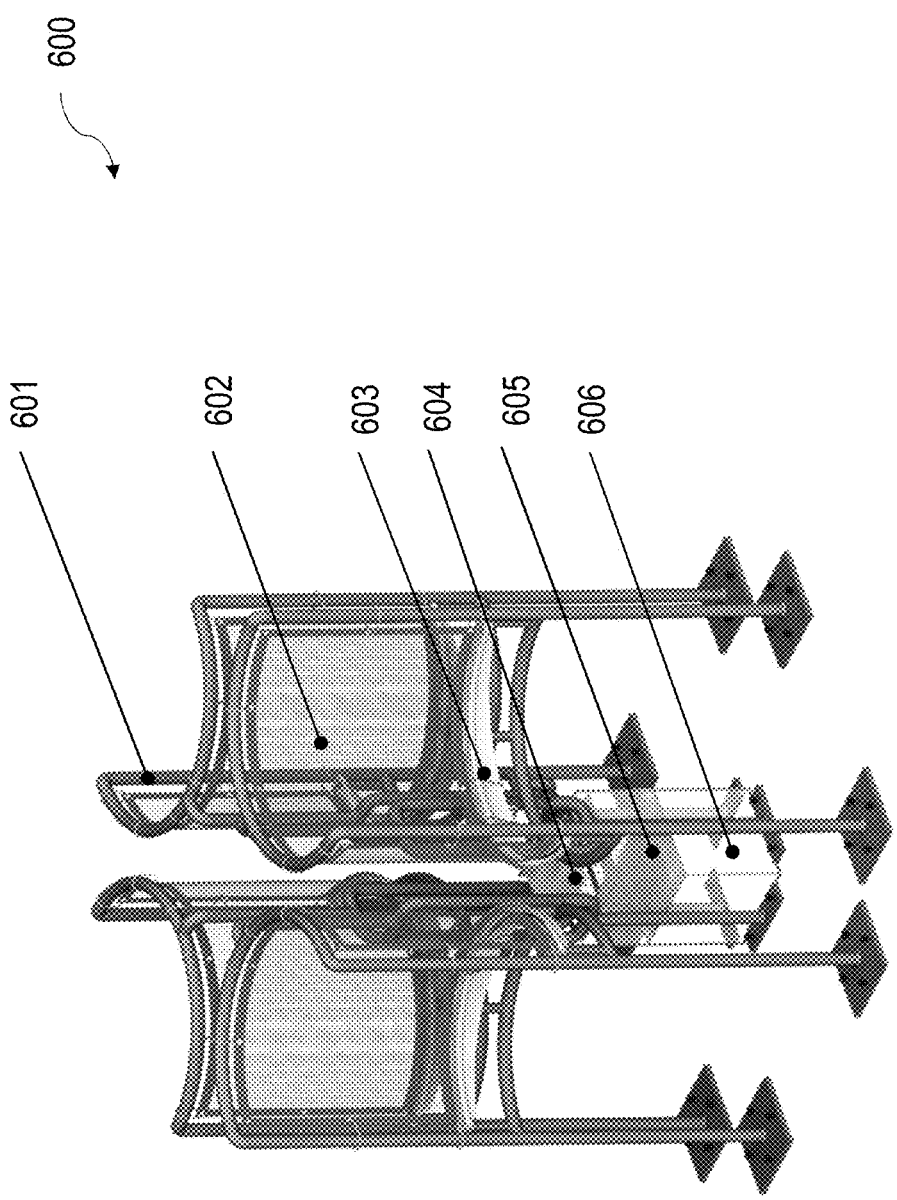
FIG. 6 is a semi-circular shaped fog-based self-powered system according to an embodiment.

FIG. 6 depicts another alternative embodiment of a fog-based self-powered system 600 of the present invention. In system 600, a series of semi-circular meshes 602 are supported by frame 601. In the embodiment of FIG. 6, hydrophobic metal meshes are employed for collection of water droplets. Accumulated water enters water distributor 603 having exits to form droplets impinging on droplet-based energy generator 605. System 600 further includes a rain hood 604 to protect system components from rain. Water that slides off the droplet based energy generator 605 is accumulated in water storage tank/reservoir 606.

Figure 7:
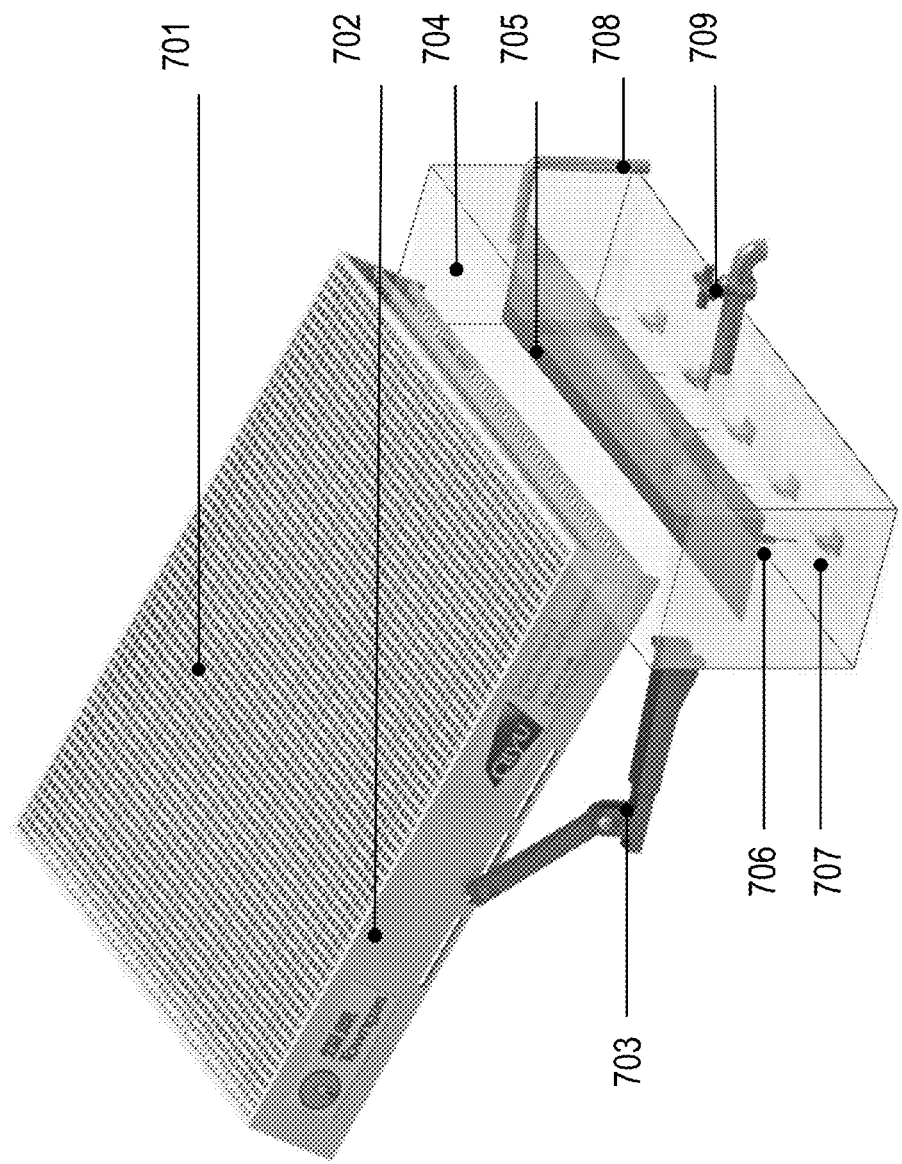
FIG. 7 is a high temperature steam-based self-powered system according to an embodiment.

FIG. 7 depicts another alternative embodiment of a fog-based self-powered system 700 of the present invention. System 700 is specifically constructed to accumulate water from steam. A 150 μm pore sized multilayer metal mesh structure 701 is supported on frame 702. A frame angle regulator 703 can control the angle of the mesh 701; this is helpful when the system is directed towards a concentrated source of steam being emitted by a source so that it can advantageously catch the greatest direction of emission. Tank 704 accumulates water from the mesh structure 701. and directs it towards droplet regulator support 705 to be distributed by droplet regulator 706. Droplet regulator provides a controlled supply of droplets to impinge on droplet-based energy generator 707. An overflow water outlet 708 is provided in the event that an oversupply of water is directed towards the droplet-based energy generators. This water outlet directs the water directly to a water accumulation reservoir and it is not used in energy generation. Water that accumulates from the energy generators may be sent to water outlet 709 for accumulation in a reservoir.

Example

Figure 8:
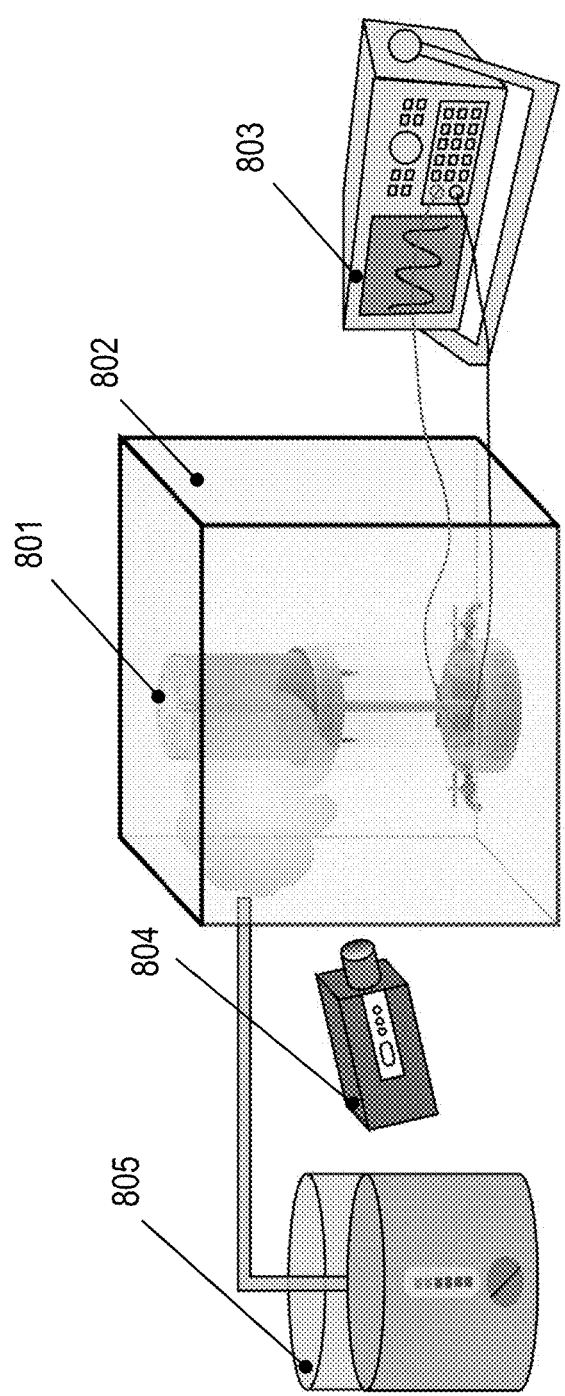
FIG. 8 is an overview of an experimental testing arrangement for a fog-based self-powered system.

An experimental apparatus is depicted in FIG. 8. The experimental system includes a fog-based self-powered system 801, a chamber 802, an oscilloscope 803, a high speed camera 804, and a humidifier 805 to quantitatively measure the fog collection rate and electricity generation ability of the FSS. After placing the whole prototype 801 in an airtight chamber 802, an ultrasonic humidifier 805 will produce fog (flow rate: 10 cm s−1) into the chamber 802 to simulate a real-world scenario, while the water mist behavior on the artificial structure of a sample will be monitored by a high-speed camera 804 coupled with a high magnification microscope in real-time mode. During this period, the weight of accumulated water will be recorded by a weighing machine, as a function of time for characterization of water harvesting efficiency. The output voltage of the DEG will be measure using an oscilloscope (Rohde and Schwarz, RTE 1024) with a high-impedance probe of 10 MΩ. The water harvesting efficiency of a FSS can reach 260 L/m2/day. The output voltage can be generated by a FSS around 200 volts, which can directly drive 100 light-emitting diodes (LEDs) instantaneously. The number and brightness of LEDs triggered by a FSS can be able to feedback on the relative humidity in a real-time, which can be packaged as a self-powered system for applications in humidity sensors.

INDUSTRIAL APPLICABILITY

The embodiments of the present invention may be used for making full use of the ubiquitous fog energy. Advantageously, a comprehensive fog-based self-powered system (FSS) may be used to combine fresh water harvesting and power generation, which are envisioned to supply power for portable devices/road illumination in remote mountain/coastal regions and at the same time provide fresh water for agricultural irrigation and domestic use. Advantageously, the FSS can also be applied as humidity sensors, which is ascribed to the linear relationship of the output currents with the relative humidity. The number or brightness of lightened LEDs triggered by our smart self-powered sensor system will be able to feedback on the real-time relative humidity in the environment. What deserves looking forward is, numerous FSS units could be assembled to form a large-scale network that can gather large amounts of electricity energy from accumulated small moisture energy and work as a macro-scale power source or sensors of city infrastructure. A scaled-up FSS network can be used as a next-generation energy source to replace conventional batteries in some applications, providing eco-friendly power.

While the present disclosure has been described and illustrated with reference to specific embodiments thereof, these descriptions and illustrations are not limiting. It should be understood by those skilled in the art that various changes may be made and equivalents may be substituted without departing from the true spirit and scope of the present disclosure as defined by the appended claims. The illustrations may not necessarily be drawn to scale. There may be distinctions between the artistic renditions in the present disclosure and the actual apparatus due to manufacturing processes and tolerances. There may be other embodiments of the present disclosure which are not specifically illustrated. The specification and the drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations.

The invention claimed is:

1. A fog-based self-powered system for collecting atmospheric water and generating electricity, comprising:
a mesh-based fog harvester for accumulating water droplets from atmospheric moisture; a droplet distributor configured to receive accumulated water droplets from the mesh-based fog harvester;
a droplet-based electrical generator for harvesting energy from the water droplets accumulated in the droplet distributor;
the droplet-based electrical generator including an electret surface for receiving the water droplets from the droplet distributor and at least two electrodes;
a water reservoir for receiving water droplets from the droplet-based electrical generator.

2. The fog-based self-powered system of claim 1, wherein the mesh-based fog harvester is a three-dimensional mesh-based fog harvester.

3. The fog-based self-powered system of claim 2, wherein the three-dimensional mesh-based fog harvester has a planar shape, a cylindrical shape, or a semi-circular shape.

4. The fog-based self-powered system of claim 1, wherein the mesh-based fog harvester includes a polymer mesh with a superhydrophobic coating.

5. The fog-based self-powered system of claim 4, wherein the superhydrophobic coating comprises nano-silica and a polysiloxane.

6. The fog-based self-powered system of claim 5, wherein the polysiloxane is polydimethylsiloxane (PDMS).

7. The fog-based self-powered system of claim 1, wherein the droplet distributor includes a flow rate controller.

8. The fog-based self-powered system of claim 1, wherein the droplet distributor includes first and second chambers.

9. The fog-based self-powered system of claim 8, wherein the second chamber includes a constricted portion to regulate droplet flow.

10. The fog-based self-powered system of claim 1, wherein the mesh-based fog harvester includes a metal mesh.

11. The mesh-based self-powered system of claim 1, wherein the droplet-based electrical generator includes a PTFE film on an indium tin oxide electrode.

12. The mesh-based self-powered system of claim 11, wherein the droplet-based electrical generator further includes a metal electrode on the PTFE film that electrically communicates with the indium tin oxide electrode.

* * * * *